United States Patent

[11] 3,603,878

[72] Inventor Joseph M. Himmelstein
 120 Norwood Avenue, Long Branch, N.J. 07740
[21] Appl. No. 802,139
[22] Filed Feb. 25, 1969
[45] Patented Sept. 7, 1971

[54] SPEED-MONITOR SYSTEM AND METHOD USING IMPULSIVE IGNITION NOISE
 1 Claim, 5 Drawing Figs.
[52] U.S. Cl. .................................................. 324/169, 340/263
[51] Int. Cl. .................................................. G01p 3/48
[50] Field of Search .......................................... 324/15, 16, 69, 70; 317/5; 340/263

[56] References Cited
OTHER REFERENCES
R. A. Hirschfeld, I. C. Engine Tachometer and "Red Line" Indicator, Electronics World, May, 1967, pp. 37-39.

Primary Examiner—Michael J. Lynch
Attorneys—Stanley Bilker and Maleson, Kimmelman and Ratner ABSTRACT: A speed monitor system using impulsive ignition noise in the form of a periodic sequence of noise bursts which is present on the power distribution buss of a motor vehicle. The noise burst are amplified and a pulse is produced for each noise burst to develop a sequence of pulses. An output signal is generated proportional to the time rate of the sequence of pulses and is therefore proportional to the engine speed.

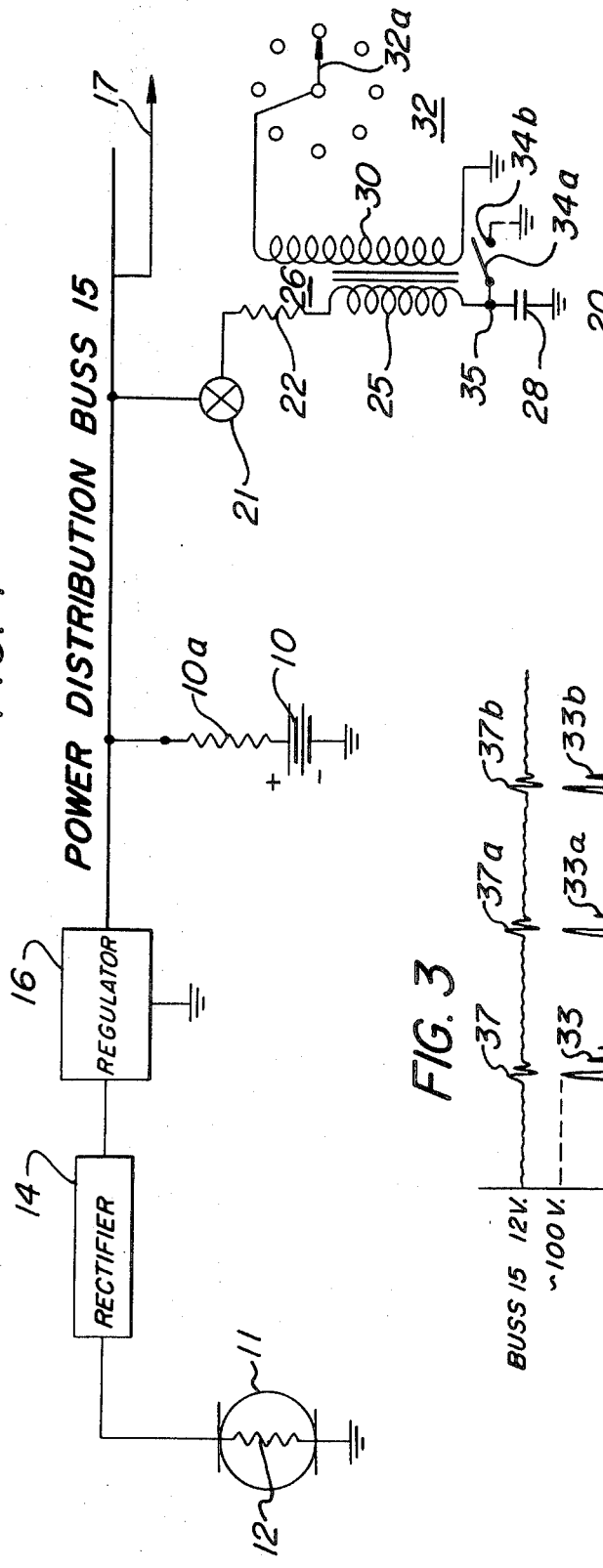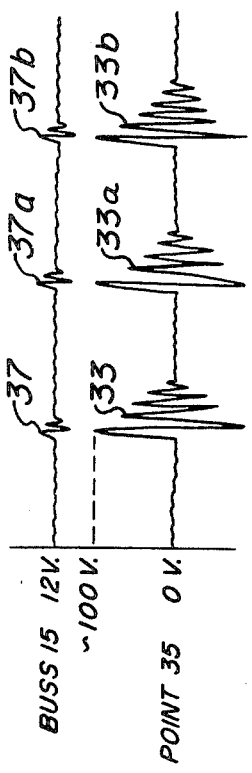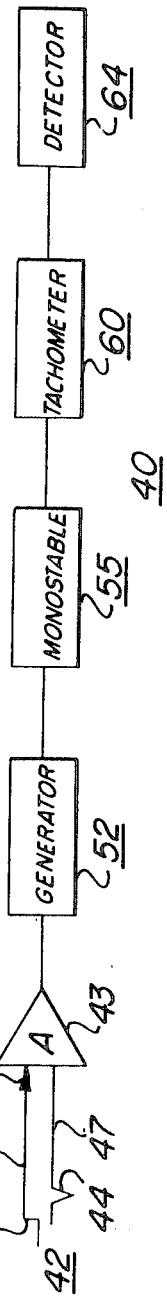
FIG. 1
FIG. 3
FIG. 4
INVENTOR
JOSEPH M. HIMMELSTEIN

INVENTOR
JOSEPH M. HIMMELSTEIN

SPEED-MONITOR SYSTEM AND METHOD USING IMPULSIVE IGNITION NOISE

BACKGROUND OF THE INVENTION

1. Field of the Invention

This invention pertains to the field of art of monitoring the speed of an internal combustion engine motor vehicle.

2. Description of the Prior Art

Conventional speed monitors for motor vehicles include two basic types of indicators; one type indicates vehicle speed and the other indicates engine speed. With a manual transmission the engine and vehicle speeds are proportional though with automatic transmission these speeds are related but not proportional. A vehicle speed indicator or speedometer is normally connected to the power transmission chain while an engine speed indicator or tachometer may be electrically coupled to at least one point of the vehicle ignition system. Such electronic tachometers are conventionally coupled to the breaker points which provide timing signals which are converted to an indication of engine speed. Accordingly, electronic tachometers are complex and the installer requires specialized knowledge and equipment to make a connection from the instrument panel of the vehicle mounting the tachometer to the ignition system on the engine. Also, the signals taken from the breaker points are at the substantially very high-value voltage so that the input circuitry of the tachometer is required to be designed to sustain such high voltages.

For indication of the speed of the motor vehicle, a mechanical linkage to the transmission of the vehicle is usually connected to a speedometer on the instrument panel. It has been desired to provide an indication to the driver when desired vehicle speed has been exceeded. Accordingly, a device has been mechanically or electrically coupled to the speedometer or to the transmission chain to provide an alarm indicating excess speed. The installation of such an additional device is ordinarily performed at the factory or after factory, in a complicated procedure by a highly trained specialist having special installation equipment. Therefore, after factory installation has been expensive and not widely purchased.

SUMMARY OF THE INVENTION

In accordance with the invention, I have found that a usable engine signal indicating engine speed is present on the power distribution buss which feeds all of the electrical equipment of an internal combustion engine motor vehicle. This engine signal is also present on the buss feeder which supplies the instrument panel equipment such as the instruments, lights and cigarette lighter. By detecting the repetition rate of this engine signal the engine speed may be monitored and, additionally an indication may be produced of the speed of the engine.

I have found that this usable engine signal is in the form of impulsive noise with oscillatory content. This impulsive noise may be defined as a periodically recurring series of noise "bursts" each of which burst is produced by the breaking of current in the primary circuit of the ignition coil. The breaking is provided by the opening of the primary breaker points. As a result of the flow of high primary current through the internal resistances of the battery or the generator and through the resistances of the cable junctions, there is produced a small ripple voltage superimposed on the DC supply voltage. In accordance with the invention this ripple voltage may be amplified and the repetition information extracted.

BRIEF DESCRIPTION OF THE DRAWINGS

FIG. 1 illustrates a conventional electrical system for a motor vehicle;

FIG. 3 illustrates waveforms comparing the voltage at the powerline buss with the voltage at the breaker points;

FIG. 4 illustrates in block diagram form a speed indicator system according to the invention.

DESCRIPTION OF THE PREFERRED EMBODIMENT

Figure 2:
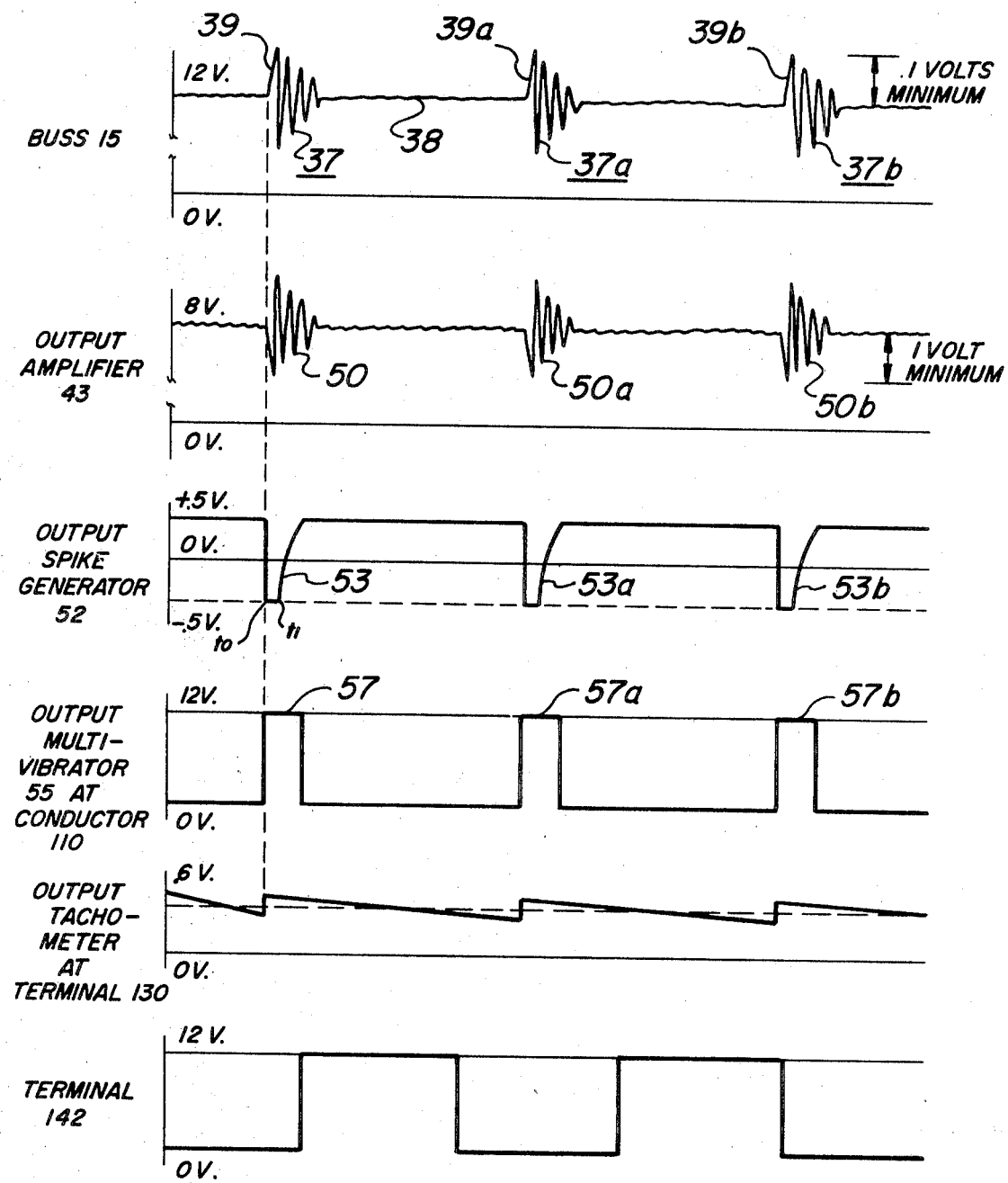
FIG. 2 illustrates waveforms helpful in understanding the present invention.

Referring now to FIG. 1, there is shown a conventional electrical system for a motor vehicle comprising the power sources of a battery 10 and an alternator 11. Alternator 11 is connected by way of a rectifier 14 to a regulator 16 with the output of regulator 16 being connected to a power distribution buss 15. As well known in the art, power distribution buss 15 may be connected to the positive side of battery 10, the negative side of which is connected to ground which is the frame of the motor vehicle. It will be understood that resistor 10a illustrated in series with battery 10 is the effective internal resistance of battery 10 and resistor 12 is the effective internal resistance of alternator 11. In addition, the connections between alternator 11 and batter 10 include resistances at the junctions of the connecting cables and wires (not shown).

Power distribution buss 15 provides electric power for all of the electrical accessories, instruments, lights and convenience features for the motor vehicle. Connected to buss 15 are one or more instrument panel feeders 17 which provide electric power for the instruments, lights, cigarette lighter, etc. mounted on the instrument panel. Another connection is made to buss 15 to supply power for the ignition system 20. Ignition system 20 may be traced by way of buss 15, ignition switch 21, ballast resistor 22, primary winding 25 of ignition coil 26, junction 35, capacitor 28, and then to ground. A secondary winding 30 of coil 26 is connected to an arm 32a of distributor 32. In order to make and break the current through primary winding 25, the lower end of that winding, viz, junction 35, is connected to a movable arm 34a of breaker points 34 the fixed contact 34b of which is connected to ground. As well known in the art movable arm 34a is actuated by a distributor cam to interrupt the primary current thereby to provide a high voltage in the secondary 30 or ignition circuit.

As shown in FIG. 3 at junction 35, for each break of points 34a a noise burst or voltage impulse 33–33b is produced having high frequency content. Specifically, each impulse comprises an initial large voltage swing and oscillations after the initial swing as a result of induced ring-back from the secondary winding circuit. Prior engine speed indicators have used junction 35 as a source of engine speed signal and converted that signal into an indication of engine speed. However, this voltage is of substantially large value so that the input circuitry of conventional speed indicators require special protection to sustain this voltage.

More particularly, in generating the signal at junction 35 it will be understood that immediately prior to the opening of points 34, junction 35 is at ground potential. As the points 34 open, junction 35 is driven to a high positive-going potential by the action of primary winding 25 operating to sustain the current flow. As a result the waveform at junction 35 is highly inductive in nature.

Ignition noise signals 37–37b of a different character are produced at distribution buss 15 as illustrated in FIGS. 2 and 3. Each of the noise signals 37–37b is generated at the time of opening or breaking of points 34 and each signal has an initial positive-going leading edge, 39– b respectively. This positive-going leading edge is produced by the interruption of that component of current which had previously been driving the primary winding 25. In contrast to the signal at point 35, the noise signal at buss 15 is resistive in nature and of extremely low impedance due to the connection to ground by way of battery 10. The remainder of each of the noise signals is provided by the induced ring-back from the secondary circuit of coil 26.

It will now be understood that in accordance with the invention the noise signals on buss 15 are provided by the interruption of the current through primary winding 25 and are proportional to the speed of the engine. These signals are transmitted throughout the electrical system of the motor vehicle which includes the instrument panel. At the instrument panel a convenient point of access to these noise signals is at the cigarette lighter. Accordingly, the female contact of the lighter receptacle may receive a male plug 42 of a speed indicator system 40 shown in block diagram form in FIG. 4. The center connector 41 of the cigarette lighter plug 42 is connected by way of a conductor 46 to an input terminal 43a of a class A transistor amplifier 43. The grounded terminal 44 of plug 42 is connected by way of a ground conductor 47 to an input of amplifier 43. Conductor 47 is effective as the ground buss for system 40 and conductor 46 is effective as the positive supply line for each of the circuits of system 40 as will later be described in detail.

As shown in FIGS. 2 and 3 the input signal to amplifier 43 comprises noise signals 37–37b produced on power distribution buss 15. The output of amplifier 43 provides signals 50–50b which are inverted and amplified replicas of noise signals 37–37b respectively. The alternator ripple 38 is suppressed by amplifier 43 so that this ripple signal does not appear at the output of amplifier 43. The output of amplifier 43 is applied to a spike generator 52 which provides a sequence of negative-going spikes 53–53b with each of the spikes beginning at the leading edge of the corresponding signals 50–50b. The spikes are limited in negative-going amplitude and applied to an input of a monostable multivibrator circuit 55. Each leading edge of spikes 53–53b triggers multivibrator 55 to produce positive going rectangular shaped pulses 57–57b respectively of constant amplitude.

Rectangular pulses 57–57b are integrated by a tachometer circuit 60 which provides a sawtooth output of substantially small valued slope. The average value of this output is proportional to the time rate of pulses 57–57b and is also proportional to the engine speed. Accordingly, the meter 63 may be used to convert the average value of the output to an indication of engine speed.

In addition pulses 57–57b may be applied to a detector 64. When a selected fraction of the voltage level of tachometer 60 output is equal to or greater in value than a threshold value, detector 64 actuates a buzzer or flashes a light.

Thus, in accordance with the invention, by a simple connection to the power distribution buss there is provided access to usable engine signal information in the form of noise bursts. This noise may be amplified, pulses generated and then the engine speed monitored. Specifically, an indication may be produced from these pulses of engine speed. The foregoing is achieved at the low voltage of the power buss without the necessity of a connection to the ignition system at the high voltage at the breaker points.

Figure 5:
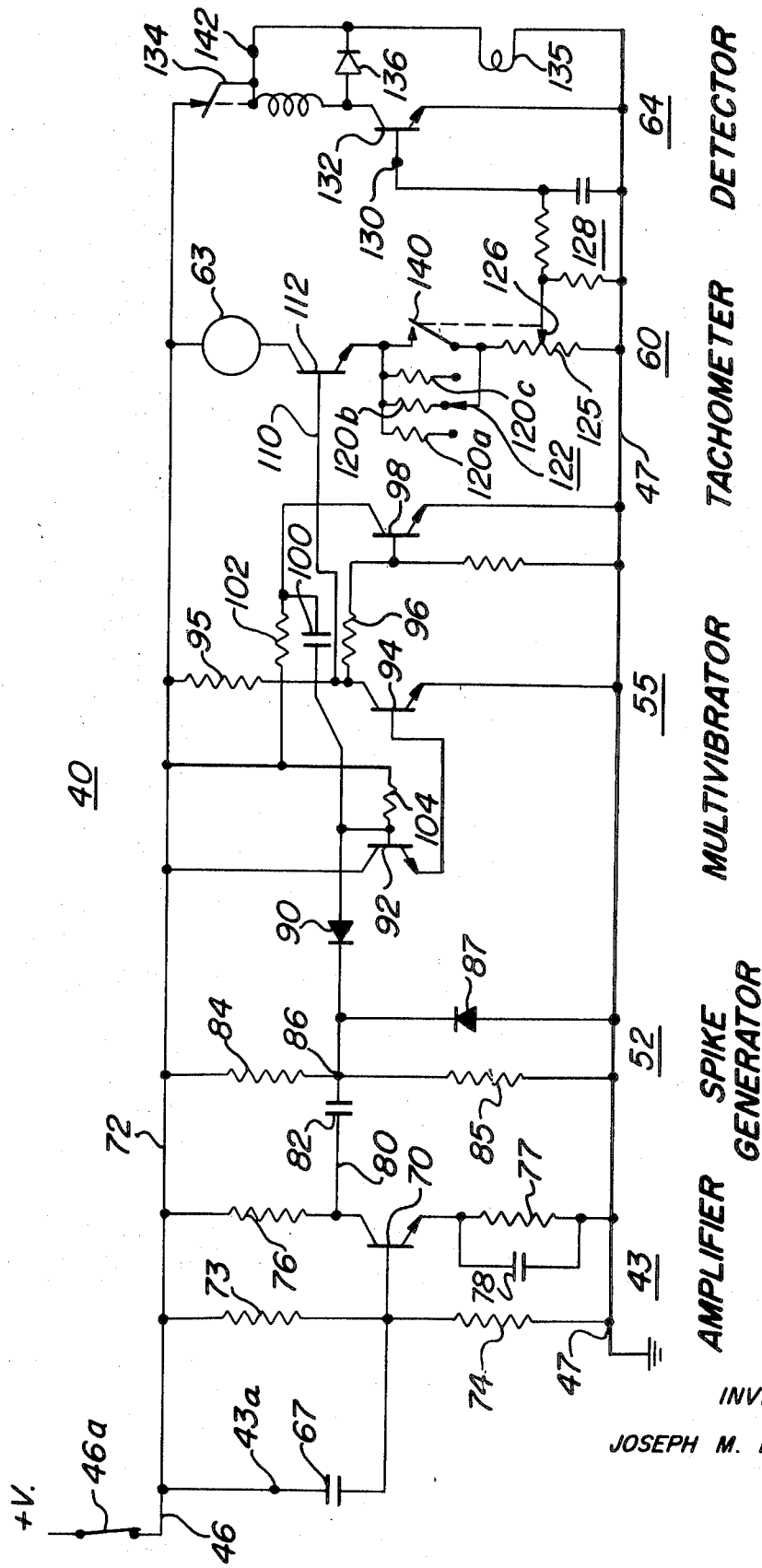
FIG. 5 illustrates in detail circuits of the system of FIG. 4.

Referring now to FIG. 5, there is shown the circuit details of block diagram FIG. 4. Input conductor 46 is connected by way of amplifier input 43a and a capacitor 67 to the base of a NPN transistor 70. Transistor 70 comprises the active amplifying element of amplifier 43 with the AC component of the input signal applied to the base thereof. The DC component of the input signal is prevented from being applied to the base by capacitor 67 and is applied by way of a conductor 72 which provides the DC power supply necessary for the various stages of system 40. A bias supply is provided for transistor 70 by a voltage-dividing pair of resistors 73 and 74 with one end of the voltage divider being connected to conductor 72 and the other end being connected to grounded terminal 47. The collector of transistor 70 is connected by way of a load resistor 76 to supply conductor 72. The emitter of transistor 70 is connected to ground terminal 47 by way of a resistor 77 which is bypassed by a capacitor 78 to provide low AC impedance from the emitter to ground.

In a conventional manner the signal appearing at input terminal 46 is amplified by amplifier 43 and applied by way of the collector of transistor 70 and conductor 80 to the input of a spike generator 52. Generator 52 comprises a series capacitor 82 having one end connected to conductor 80 and the other end connected to a common junction 86 of voltage divider resistors 84 and 85. The other end of voltage divider resistor 84 is connected to conductor 72 and the other end of resistor 85 is connected to ground. Resistor 85 is shunted by a diode 87, the anode of which is connected to ground terminal 47. Voltage divider resistors 84 and 85 provide a normally positive potential at junction 86 with respect to ground.

As illustrated in FIG. 2, at time $t_o$ amplified signal 50 produces at conductor 80 a negative-going leading edge which is applied to the left-hand side of capacitor 82. Accordingly, the right-hand side of capacitor 82 at junction 86 produces a negative-going sharply falling signal which causes clamping diode 87 to conduct when the voltage at junction 86 is slightly negative with respect to ground. With diode 87 turned on, point 86 is maintained at this slightly negative voltage. Thereafter, capacitor 82 begins discharging through the resistor 76 until time $t_1$ when diode 87 is turned off. Capacitor 82 continues to discharge thereby changing the potential at junction 86 in a positive-going direction until a slightly positive potential is achieved. As a result of the time of discharge of capacitor 82 spike generator 52 does not respond to the ringing voltages or ripple voltages 38–38b beyond the leading edge of 50. Accordingly, a clean waveform for driving monostable multivibrator 55 is produced.

Specifically, spike signal 53 is applied by way of a decoupling diode 90 to the base of a left-hand transistor 92 of multivibrator 55. This negative-going spike 53 is in a direction to turn off normally on transistor 92. The emitter of transistor 92 is directly connected to the base of a transistor 94 the emitter of which is connected to ground and the collector of which is connected by way of a resistor 95 to supply conductor 72. Transistor 94 is maintained normally on and thus when transistor 92 is turned off, transistor 94 is also turned off. As a result, the potential at the collector of transistor 94 changes in a positive-going direction which is applied by way of a resistor 96 to the base of a normally off transistor 98. Accordingly, transistor 98 is turned on producing a negative-going potential change at its collector which is applied by way of a multivibrator coupling capacitor 100 to the base of transistor 92.

Thus, as well known in the art, regenerative action causes transistor 92 to be fully turned off and transistor 98 to be fully turned on thereby initiating the quasistable state. The duration of the quasistable state is determined by the discharge circuit of capacitor 100 which has been previously charged. This discharge circuit may be traced by way of conductor 72, a base resistor 104, capacitor 100 and then through conductive transistor 98 to ground. When capacitor 100 has discharged so that the left-hand plate thereof is at a slightly positive voltage, transistor 92 begins to turn on. By way of regenerative action transistor 98 is caused to turn off thereby to terminate the quasistable state. In this way a positive-going rectangular pulse 57 is generated having a time duration equal to the duration of the quasistable state.

Rectangular pulses 57–57b are applied from the output of multivibrator 55 by way of conductor 110 to the base of transistor 112 of tachometer 60. The positive-going potential of pulse 57 is effective to turn on transistor 112. With transistor 112 turned on, current may be traced from conductor 72, DC milliammeter 63, transistor 112, a selected resistor 120b and through selector switch 122 and a winding of a potentiometer 125 to ground conductor 47. At the termination of the quasistable state transistor 112 is turned off and the foregoing current ceases to flow. After a succession of pulses from multivibrator 55 an average DC current level is established in the foregoing path through meter 63 which is proportional to the frequency of the rectangular pulses 57 and thereby proportional to the engine speed. In this manner meter 63 may provide an indication of engine speed directly on its scale.

A wiper arm 126 of potentiometer 125 is connected by way of an R–C network 128 and a terminal 130 to the base of an NPN transistor 132. The elements of network 128 are selected so that the high frequency content appearing at potentiometer 125 are effectively removed. There is produced at terminal 130 a relatively steady state current as shown in FIG. 2 whose average value is proportional to the fraction of the total voltage across potentiometer 125 which is picked off by wiper 126. When this steady state current is positioned to turn on transistor 132 a buzzer circuit may be completed from conductor 72, buzzer 134 through transistor 132 to ground 47. Bulb 135 is normally on and when the buzzer is actuated the bulb is caused to flash. Diode 136 provides a decay path for the buzzer current.

Potentiometer wiper arm 126 is mechanically coupled to the movable arm of a switch 140 which is connected between the emitter of transistor 112 and potentiometer 125. This mechanical connection between arm 126 and 140 is of the type that when wiper arm 126 is turned or activated by the operator of the vehicle in either direction by any amount the switch is closed only during the time that the wiper arm is moved. Accordingly, selected resistor 120b is shunted by a direct connection thereby decreasing the emitter circuit resistance by the value of that resistor. In operation the driver operates his vehicle at a speed that he would like to maintain. At that time, he turns arm 126 until buzzer 134 just sounds which is the threshold of sound and then releases the arm 126. The operator has now set the system to alert, and buzzer 134 sounds only when the engine speed exceeds the desired speed by a preselected percent determined by selector switch 122. This excess over threshold may be defined as an incremental change in speed. When the operator released wiper 126, switch 140 was opened and the resistance of the emitter circuit was thereby increased by the preselected resistor 120b. Resistor 120b may be selected to provide a 10 percent margin or increment of protection above the selected speed. On the other hand, resistor 120a may provide a 5 percent and resistor 120c may provide a 20 percent margin or increment.

It will be understood that when switch 140 was opened the potential at terminal 130 decreases from the threshold which causes buzzer 134 to sound to a value below the threshold as controlled by the selected resistor 120a–c. In order to again reach the threshold without further adjustment the engine speed must increase beyond the threshold speed by a preselected increment thereby increasing the current through the emitter circuit and increasing the potential at terminal 130. Thus, with switch 140 open the buzzer sounds upon reachievement of threshold due to the engine speed increasing beyond the protection range of the selected resistor.

On-off switch 46a is provided within the structure of potentiometer 125 in the well-known combination of on-off switch and variable resistor controlled by the same shaft. When the speed monitor system is not to be active, the wiper arm 126 is turned to the bottom of its run, which act opens the switch 46a, removing the positive supply voltage from the device, and so deactivating it.

I claim:

1. In an internal combustion engine motor vehicle having a power distribution buss which develops impulsive ignition noise in the form of a periodic sequence of noise bursts a speed monitor system which comprises amplifier means connected to said buss for amplifying said noise bursts, pulse means for producing an individual pulse for each noise burst to provide a sequence of pulses, means for generating an output signal proportional to the frequency of said pulses and thereby proportional to said engine speed, monitor means for producing an alarm indication when said output signal is equal to or greater in value than a threshold value, means for selectively varying the threshold value to obtain an alarm indication when said engine speed is at a predetermined value, means for decreasing said output signal by a preselected percentage of its value whereby said alarm indication is produced only when said engine speed exceeds the threshold by said preselected percentage, and means for temporarily short circuiting said decreasing means during the time said selectively varying means is adjusted.